United States Patent [19]

Walles

[11] 4,000,246

[45] Dec. 28, 1976

[54] REMOVAL OF GASES FROM AN ENCLOSED SPACE USING METAL HYDROCARBYL OXIDES

[75] Inventor: Wilhelm E. Walles, Midland, Mich.

[73] Assignee: The Dow Chemical Company, Midland, Mich.

[22] Filed: Jan. 31, 1975

[21] Appl. No.: 546,045

[52] U.S. Cl. .................... 423/230; 423/210; 423/219; 423/237; 423/240; 423/241; 423/244; 423/247; 252/181.6; 252/181.7; 215/13 R; 220/9 C; 316/25

[51] Int. Cl.$^2$ .................... B01D 53/34

[58] Field of Search .......... 423/210, 220, 230, 219, 423/244, 240, 241, 237, 247; 252/181.1, 181.6, 181.4, 181.7; 316/25; 215/13 R; 220/9 C

[56] References Cited

UNITED STATES PATENTS

| | | | |
|---|---|---|---|
| 2,394,887 | 2/1946 | Berl | 423/240 |
| 2,527,984 | 10/1950 | Bruining et al. | 252/181.4 X |
| 3,370,915 | 2/1968 | Sperberg | 423/219 |
| 3,598,518 | 8/1971 | Goto | 423/219 |
| 3,828,960 | 8/1964 | Walles | 215/13 R |

*Primary Examiner*—Earl C. Thomas
*Attorney, Agent, or Firm*—R. B. Ledlie; M. S. Jenkins

[57] ABSTRACT

Gases are removed from enclosed spaces by (1) purging the space to be enclosed with a reactive gas such as carbon dioxide, (2) adding a metal hydrocarbyloxide and a solid absorbent for the volatile reaction products of the reactive gas and the metal hydrocarbyloxide, e.g., a solid absorbent such as activated charcoal, and (3) enclosing the space, e.g., by hermetically sealing the container. This method for gas removal is particularly useful in the production of thermal insulating articles such as double walled vacuum containers for storage of foods and beverages.

9 Claims, No Drawings

REMOVAL OF GASES FROM AN ENCLOSED SPACE USING METAL HYDROCARBYL OXIDES

BACKGROUND OF THE INVENTION

This invention relates to methods for removal of gases from enclosed spaces and to vacuumized articles prepared thereby.

In the production of various thermal insulating articles such as vacuum bottles, it is well known to evacuate enclosed spaces provided in such articles and subsequently to seal the enclosed spaces from the atmosphere. A wide variety of methods for accomplishing the vacuumization of such articles are known, for example, as described in U.S. Pat. Nos. 3,167,159, 3,828,960 and 3,114,469.

Unfortunately, most conventional vacuumization methods require prolonged pumping to evacuate gases or prolonged heating periods to activate the gas absorbing materials (getters) in order to achieve the desired high level of evacuation, i.e., below $10^{-1}$ Torr (mm Hg) for vacuum bottles filled with getters and below $10^{-4}$ Torr for vacuum bottles containing no getter.

Therefore it would be highly desirable to provide an efficient method for evacuating enclosed spaces without the use of mechanical means to draw vacuum or prolonged heating periods to activate conventionally employed getters.

SUMMARY OF THE INVENTION

In one aspect, the present invention is a method for removing gases from an enclosed space which comprises the steps of (1) filling or purging the space to be enclosed hereinafter referred to as the defined space with a reactive gas, (2) placing a hydrocarbyl oxide having from 2 to 15 carbon atoms of a metal of Groups 1a, 1b, 2a, 2b, and 3 of Mendeleev's Periodic Table of the Elements and a solid absorbent for the volatile reaction products of the reactive gas and the hydrocarbyloxide in the space and (3) enclosing the space after which the gas is spontaneously removed from the vapor phase by its reaction with the metal hydrocarbyloxide to form volatile reaction products that are absorbed by the solid absorbent.

The time taken to achieve vacuum by this method may take several days. However, a lengthy period is acceptable to most commercial operations since no further use of manufacturing equipment is required. Thus, production rates are not significantly affected by the length of this period.

In another aspect, the present invention is an article defining an enclosed space wherein the gases thereof have been removed by the aforementioned method.

The present invention is particularly useful in the manufacture of thermal insulting containers employed for maintaining gaseous, liquid or solid materials in a hot or cold state for prolonged periods of time.

DETAILED DESCRIPTION OF THE EMBODIMENT

The article defining the space (defined space) from which gases are to be removed is not critical and can be fabricated of any material. Advantageously, however, it is fabricated of a material which is a significant barrier to most gases particularly the atmospheric gases. Exemplary materials are metallic compositions such as the various types of steel, copper, bronze, nickel, aluminum and the like; non-metallic compositions such as glass, some barrier plastics comprising polymers such as poly(vinylidene chloride), poly(vinyl chloride), Polyacrylonitrile, polycarbonate and combinations of metallic and non-metallic compositions such as metal/plastic laminates as shown in U.S. Pat. No. 3,828,960, glass/plastic laminates and the like. Such articles and methods for making them are common knowledge to those skilled in the fabricating arts.

In the practice of the method of this invention, the defined space is purged or filled with the reactive gas by any conventional means for purging vessels or containers with gases. The defined space shall be considered to be adequately purged when the total amount of non-reactive gas remaining is less than that which will yield a partial pressure of $0.5 \times 10^{-1}$ Torr, preferably less than $0.1 \times 10^{-1}$ Torr.

For the purposes of this invention, the term reactive "gas" shall mean a gaseous compound or a mixture of gaseous compounds that reacts with the metal hydrocarbyloxide to form a compound(s) having a molecular weight(s) greater than that of the gaseous compound(s). Preferably the gas is one that reacts with the metal hydrocarbyl oxide to form a liquid organic compound. An example of a reactive gas is carbon dioxide which reacts with the metal hydrocarbyl oxide to form an ether which is readily absorbed by the solid absorbent. Examples of other reactive gases which are sufficiently reactive to be suitable are carbon monoxide, hydrogen sulfide, carbonyl sulfide, sulfur dioxide chlorine, ammonia, hydrogen chloride and hydrogen bromide and the like. However, such gases are generally too poisonous to be used on a large industrial scale. Oxygen is also sufficiently reactive, but must be used with great care to avoid explosion, particularly when used in combination with finely divided carbon. Accordingly, carbon dioxide is preferred.

Prior to the time that the defined space is completely enclosed (sealed), the metal hydrocarbyloxide and the solid absorbent are placed in the defined space such that the reactive gas contacts and reacts with the metal hydrocarbyloxide and the volatile reaction products thereof are absorbed by the solid absorbent. In order to achieve maximum gas removal (vacuum), the metal hydrocarbyloxide is present in at least an amount which is the stoichiometric equivalent of the amount of the reactive gas. To insure essentially total gas removal, the metal hydrocarbyloxide is present in amounts which are 1.5 to 2 times the stoichiometric equivalent of the reactive gas present. The solid absorbent is present in an amount sufficient to absorb the volatile product(s) resulting from the reaction of the reactive gas and the metal hydrocarbyloxide. Preferably an excessive amount of the absorbent solid is employed. In fact, if a very large excess of the absorbent solid in particulate form is employed such that the defined space is essentially filled with the solid, the solid also serves as an insulator against heat transmitted by reducing the ability of the residual gases to transport heat and by absorbing infrared rays.

Suitable metal hydrocarbyloxides are those corresponding to the chemical formula $(RO)_aM$ wherein R is a hydrocarbon radical such as alkyl having 2 to 10 carbon atoms, aryl having from 6 to 15 carbon atoms, aralkyl having 7 to 15 carbon atoms, cycloalkyl having from 4 to 15 carbon atoms and similar hydrocarbon radicals, M is a metal of Groups 1a, 1b, 2a, 2b, and 3 of Mendeleev's Periodic Table of Elements and a is a whole number corresponding to the valence of M. Exemplary alkoxides are lithium isopropoxide, lithium butoxide, sodium ethoxide, potassium propoxide, magnesium dipropoxide, aluminum tripropoxide and other such alkoxides, particularly those having 3 to 5 carbon atoms. Alkoxides having more than 5 carbon atoms react at slower rates and are therefore less preferred. Alkoxides having 1 to 2 carbon atoms also react slowly and form nearly impermeable layers which prevent utilization of all of the alkoxide. Of these metal alkoxides, the alkoxides of lithium, and sodium especially lithium isopropoxide and normal propoxide, are preferred. The alkoxides are employed in particulate form wherein the particles have sizes in the range from about 1 to about 500 micrometers in order to maximize the total surface area of the alkoxide.

Other suitable hydrocarbyl oxides include sodium phenoxide, lithium phenoxide, sodium-B-naphthoxide and the like.

Suitable absorbent solids are carbon in various forms such as activated charcoal, various types of carbon black such as lamp black, channel black, furnace black, acetylene black and the like. Preferably, the absorbent solid is activated charcoal in particulate form wherein the particle sizes are in the range from about 0.1 to 100, preferably from about 0.5 to about 15, micrometers. The surface area of such preferred absorbent solids, as determined by a standardized nitrogen gas absorption test, is in the range from about 50 to about 2000 square meters per gram.

After the defined space has been filled with the reactive gas and the metal hydrocarbyloxide and solid absorbent have been placed therein, the defined space is completely enclosed by sealing the opening or openings through which the foregoing ingredients entered. Advantageously a hermetic seal is provided so that removal of the gases by the method of this invention is effective for a long period of time. Conventional techniques for hermetically sealing containers are satisfactory for the purposes of this invention. The particular sealing technique most advantageously chosen will depend on the material(s) to be sealed and the intended use for the article.

The following examples are given for the purposes of illustrating the invention and should not be construed as limiting its scope. All parts and percentages are by weight unless otherwise indicated.

EXAMPLE 1

Into a 100 ml. glass cylindrical chamber circumscribed by a cylindrical oven and connected to a high vacuum apparatus including pressure gauges is placed 10-20 g. of activated carbon (sold under the trademark Witco Grade 249) having an average surface area of 1200-1400 m.$^2$/g. The chamber is then heated to 300° C under vacuum to remove moisture and enclosed gases from the chamber. The chamber is cooled to ambient temperature and 1 atm. of nitrogen-gas is admitted. A 2.4 g. portion of lithium isopropoxide is placed in the chamber under nitrogen gas. After the addition of the lithium alkoxide, the chamber is then evacuated to $10^{-3}$ Torr, and 100 cm$^3$. of carbon dioxide (>99% purity) is fed into the chamber to produce an initial pressure of 0.5 atm. The removal of the carbon dioxide is observed by measuring the pressure in the chamber at timed intervals. The results are recorded in Table I.

Several additional runs are made following the preceding procedure except that different metal alkoxides or metal compounds are employed. The results of these runs are also recorded in Table I.

TABLE I

| Run No. | Metal Compound Type | Amount, g | Amount of carbon, g | Pressure, Torr | | | | |
|---|---|---|---|---|---|---|---|---|
| | | | | Initial | 1 min. | 5 min. | 20 min. | 16 hr. |
| 1 | Li(L—OC$_3$H$_7$) | 2.4 | 17.3 | 330 | 9.9 | 1.0 | 0.3 | 0.3 |
| 2* | Li(OCH$_3$) | 4.1 | 17.8 | 327 | 80 | 47 | 32 | 25 |
| 3* | LiOH | 16.2 | 13.2 | 326 | 15 | 6.9 | 3.2 | 3.0 |
| 4* | Na$_2$O | 48.4 | 7.6 | 760 | — | — | 196 | — |
| 5* | Na$_2$O** | 48.4 | 7.6 | 760 | — | — | 529 | — |

*Not an example of the invention.
**Na$_2$O heated to 100° C in vacuum before CO$_2$ absorption begins.

In the runs of Table I employing an alkoxide, the carbon dioxide gas present in the chamber, including that which is initially absorbed by the activated carbon, is chemically absorbed by the alkoxide. The alkoxide groups which leave the solid alkoxide during this chemical absorption are larger than the carbon dioxide groups entering the alkoxides; thus an impermeable layer or crust cannot be formed on the surface of the alkoxide. The alkoxide groups leaving the solid alkoxide are in turn absorbed by the activated carbon.

In Run Nos. 4 and 5, it is believed that a useful vacuum is not generated because an impermeable layer or crust is formed. The crust is not disrupted or entirely prevented as in the case of the alkoxides because no groups exit from the sodium oxide during absorption.

EXAMPLE 2

Using a quart size plastic vacuum bottle as disclosed in U.S. Pat. No. 3,828,960, the defined space thereof is evacuated by the following procedure. To the defined space of the vacuum bottle having a volume of 266 ml. is placed 133 g. of activated carbon as employed in Example 1 under a carbon dioxide atmosphere. Prior to placing it in the defined space, the activated carbon is outgassed by heating it at 300° C. and under a vacuum of $10^{-3}$ Torr and is then placed under one atmosphere of pure carbon dioxide. A 50 g. portion of lithium isopropoxide in tablet form is added to the defined space, and the space is enclosed by sealing in a conventional manner, e.g. as disclosed in U.S. Pat. No. 3,828,960. After 24 hours, in which time suitable vacuum in the defined space has been achieved, the resultant bottle is filled with 950 ml. of hot water (95° C), stoppered with a plastic vacuum cap as disclosed in U.S. Pat. No. 3,856,172 to Walles, and allowed to stand at room temperature (21° C) for 12 hours. The temperature of the water after 12 hours is 80° C.

For comparison purposes, a similar run is carried out except that no lithium isopropoxide is placed in the defined space of the bottle. The bottle is filled with 950 ml. of hot water (95° C), stoppered and allowed to stand at 21° C for 12 hours. The temperature of the water after this period is 30° C.

What is claimed is:

1. A method for removing gases from an enclosed space comprising the steps of (1) purging the space to be enclosed with a reactive gas; (2) placing (a) a hydrocarbyloxide corresponding to the chemical formula $(RO)_n M$ wherein R is a hydrocarbon radical having from 2 to 15 carbon atoms, M is a metal of Groups 1a, 1b, 2a, 2b and 3 of Mendeleev's Periodic Table of the Elements and a is a whole number corresponding to the valence of M and (b) a solid absorbent in the space, said reactive gas being capable of reacting with the hydrocarbyloxide to form a volatile reaction product, said absorbent being capable of absorbing said volatile reaction product; and (3) enclosing the space whereby the gas is removed from the vapor phase by reacting with the metal hydrocarbyloxide to form volatile reaction products that are absorbed by the solid absorbent.

2. The method of claim 1 wherein the reactive gas is carbon dioxide.

3. The method of claim 2 wherein the hydrocarbyloxide is an alkoxide of lithium, sodium or potassium wherein the alkoxide has 2 to 10 carbon atoms.

4. The method of claim 2 wherein the hydrocarbyloxide is an alkoxide of lithium having 3 to 5 carbon atoms.

5. The method of claim 2 wherein the hydrocarbyloxide is lithium isopropoxide.

6. The method of claim 5 wherein the solid absorbent is a finely divided powder of activated carbon.

7. The method of claim 1 wherein the enclosed space is defined by a thermal insulating container employed for maintaining gaseous liquid and solid materials in hot or cold state.

8. The method of claim 1 wherein the hydrocarbyloxide is an alkoxide of lithium having from 3 to 5 carbon atoms, the reactive gas is a carbon dioxide, the solid absorbent is a finely divided powder of activated charcoal and the enclosed space is defined by a thermal insulating container whereby the enclosed space is substantially evacuated of gases.

9. The method of claim 8 wherein the alkoxide is in the form of particles having sizes in the range from about 1 to about 500 micrometers and the charcoal is in the form of a particulate having particles of sizes in the range from about 0.1 to 100 micrometers such that said particulate has a surface area in the range from about 50 to about 2000 square meters.

* * * * *